United States Patent Office 3,027,531
Patented Mar. 27, 1962

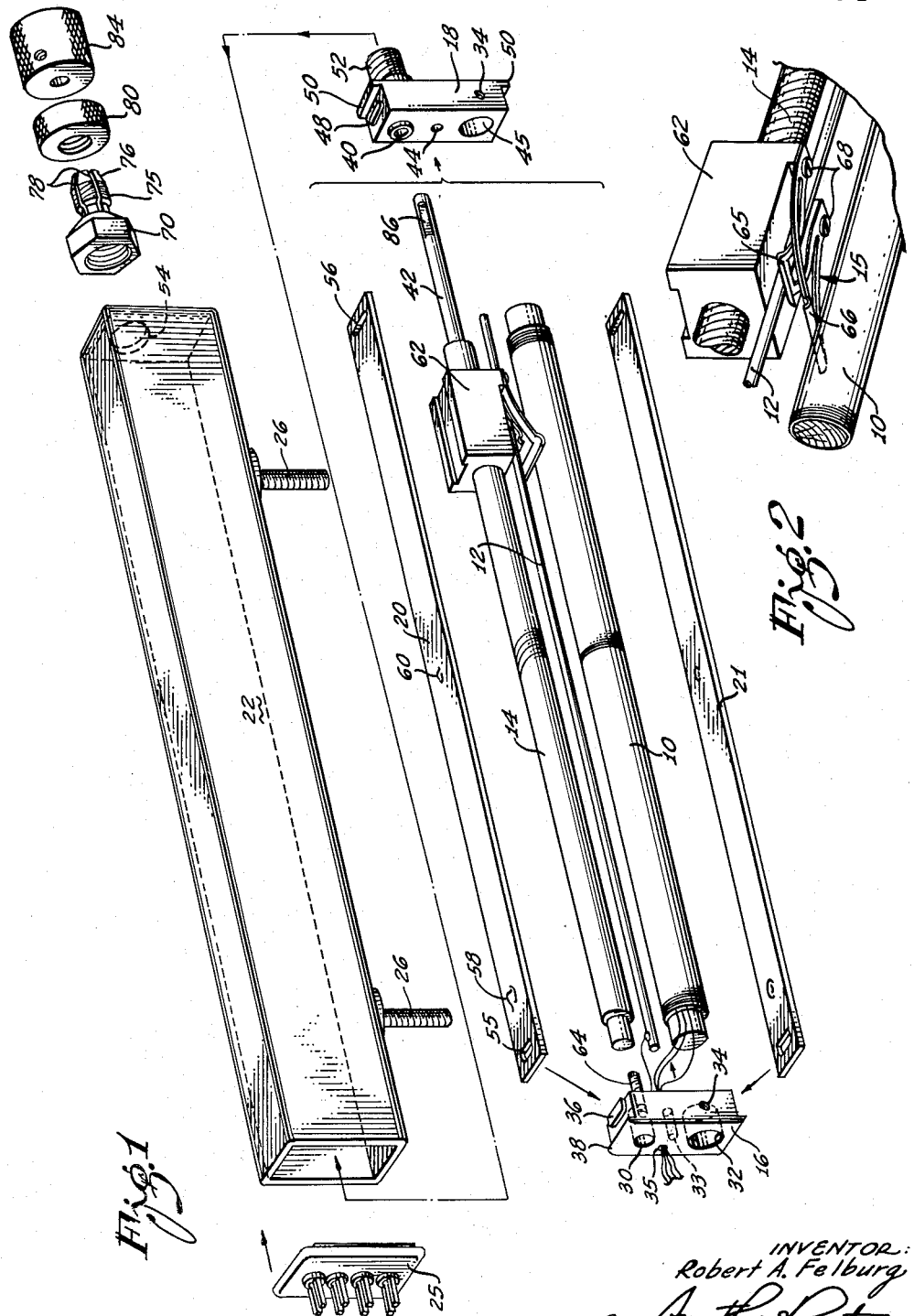

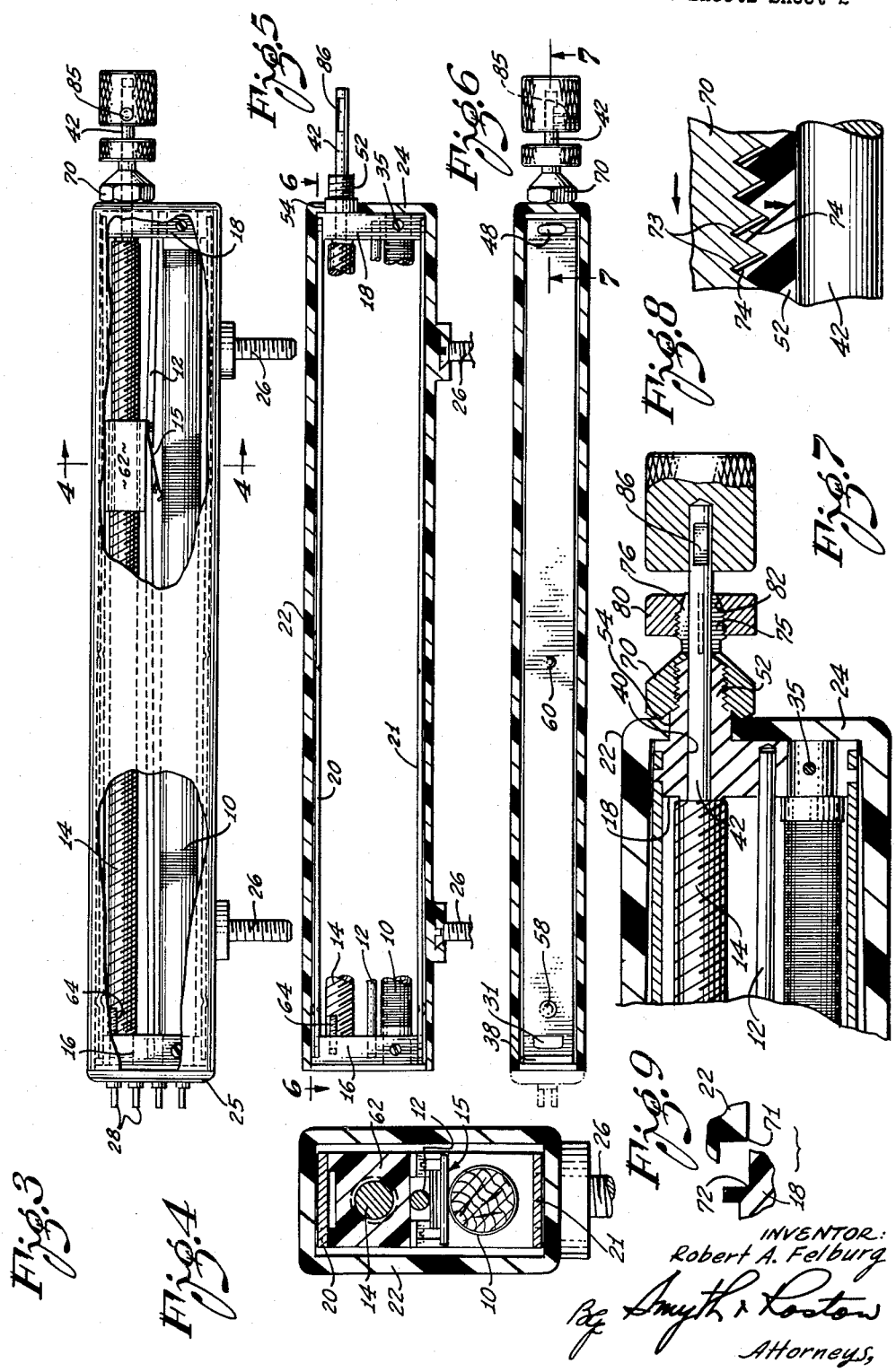

3,027,531
VARIABLE IMPEDANCE
Robert A. Felburg, 5531 Chariton St., Los Angeles, Calif.
Filed Oct. 14, 1959, Ser. No. 846,424
15 Claims. (Cl. 338—183)

This invention relates to the construction of an electrical component of the type in which a traveling nut controlled by an actuating screw carries a wiper or contact to traverse an elongated conductor member such as the resistance coil of a potentiometer or the impedance coil of a delay line. More particularly, the invention is directed to a hermetically sealed component of this general type and the method of fabricating and assembling such a component.

One requirement met by the invention is for a construction that makes possible a highly economical assembly procedure. Some kind of support structure must be provided by the assembly procedure for anchoring the two ends of the impedance coil, for anchoring the two ends of an adjacent ground rod, and for journaling the two ends of the actuating screw. The completed support structure must then be hermetically sealed with provision for electrically connecting the enclosed functioning parts with external circuitry and with provision for operating the actuating screw from the exterior of the sealed structure. The assembly of such a sealed structure is usually carried out in a time-consuming manner with numerous steps of threading parts together or riveting parts together and with additional steps for sealing the structure by bonding agents and by the use of sealing members or packing.

To meet this requirement for assembly economy, the present invention provides a construction which permits most of the fabrication steps to consist simply of moving mating parts into interlocking engagement with each other. In this regard, the invention is characterized by the concept of providing a rectangular frame of interfitting end and side members and of providing a casing to serve two functions, one function being to confine the frame to hold the interfitting members together in a positive manner and the other function being to hermetically seal the frame and the associated parts from the atmosphere.

With the traveling nut mounted on the actuating screw, it is a simple matter to insert the opposite ends of the actuating screw, the opposite ends of the ground rod and the opposite ends of the impedance coil into mating recesses or apertures in the two end frame members respectively, then to mate the longitudinal frame members with the end frame members to form the longitudinal frame, and finally to insert the assembled frame likewise into the casing for confinement therein in a manner that prevents separation of the interfitting parts. The casing is then closed and sealed.

One feature of the preferred practice of the invention is that the interior of the casing tapers slightly and the over-all configuration of the frame is correspondingly tapered for a wedge fit in the casing. Another feature is that the longitudinal side members of the frame are dimpled or otherwise formed with lateral projections for pressure contact with the inner surface of the casing. As will be made apparent, another feature is the manner in which the actuating screw extends through one end of the casing in a sealed manner.

The various features and advantages of the invention will be apparent from the following detailed description and the accompanying drawings.

In the drawings, which are to be regarded as merely illustrative:

FIG. 1 is an exploded perspective view of the various parts that are assembled to form the selected embodiment of the invention;

FIG. 2 is a fragmentary perspective view showing the construction of a wiper or contact member for sliding contact with the coil member and the ground rod;

FIG. 3 is a side elevation of the completed component with portions of the casing wall broken away to shown the concealed structure;

FIG. 4 is an enlarged transverse section taken as indicated by the line 4—4 of FIG. 3;

FIG. 5 is a longitudinal sectional view of the assembled device with parts broken away;

FIG. 6 is a longitudinal section along the line 6—6 of FIG. 5;

FIG. 7 is an enlarged fragmentary section taken as indicated by the line 7—7 of FIG. 6;

FIG. 8 is an enlarged fragmentary section of FIG. 7 showing the manner in which screw threads cooperate with a desired camming action; and FIG. 9 is a fragmentary sectional view illustrating the manner in which a fluid tight joint is effected.

As best shown in FIG. 3, the working parts of the selected embodiment of the invention include a first conductive member such as a coil member 10, an adjacent conductive member such as a ground rod 12 parallel thereto, an actuating screw member 14, and a contact member or wiper 15 controlled by the actuating screw member and in sliding contact with both the coil and the ground rod. In this instance, the coil member 10 is an impedance member of a well-known construction to serve as a delay line with the delay period adjustable by the positioning of the wiper 15.

These working parts are mounted in an elongated rectangular frame comprising two end frame members 16 and 18 and two longitudinal frame members 20 and 21. The rectangular frame is enclosed by a casing in the form of an elongated shell 22 that is closed at one end by an end wall 24, the other end of the shell being closed and sealed by a flanged closure plate 25. The shell 22 may be molded from a hard rigid phenolic resin with mounting screws 26 imbedded therein, the shell being slightly tapered longitudinally internally in the usual manner to facilitate the molding operation. The closure plate 25 may be made of the same material with four metal terminal elements 28 extending therethrough for operatively connecting the component to external circuitry. As shown in FIG. 1, four wires are provided for connection to the terminal elements 28, one of the wires being connected to the ground rod 12 and the other three wires being connected to the impedance member 10.

The two end frame members 16 and 18 are preferably made of a suitable plastic of slightly resilient character. Nylon has been found to be excellent for this purpose. As best shown in FIG. 1, the end frame member 16 has a bore 30 to journal one end of the actuating screw member 14, a bore 33 to seat one end of the ground rod 12, a bore 32 to seat one end of the impedance member 10 and a small bore 35 for the wires that are connected to the metal terminal elements 28. The molded end frame member 16 is further provided with a small transverse bore 34 that is tapped to receive a set screw 35 (FIG. 5) for anchoring the end of the impedance member 10. For the purpose of interfitting the end frame member 16 with the adjacent ends of the two longitudinal frame members 20 and 21, the end frame member is formed at its opposite ends with projections or lugs 36 to mate with corresponding sockets in the longitudinal frame members. Preferably the end frame member 16 is further formed with opposite end flanges 38 to abut the ends of the longitudinal frame members 20 and 21.

As best shown in FIG. 1, the second end frame member 18 has a bore 40 to journal a smooth shank portion 42 of the actuating screw member 14, a second bore 44 to seat the second end of the ground rod 12, and a third bore 45 to seat the second end of the impedance member 10. Here again, the end frame member has a transverse bore 34 to receive a set screw 35 for anchoring the end of the impedance member 10. The second end frame member 18 also has projections or lugs 48 to mate with corresponding sockets in the longitudinal frame members and also has opposite end flanges 50 to abut the ends of the longitudinal frame members.

As best shown in FIG. 7, the end frame member 18 is further formed with an integral nipple portion 52 through which the bore 40 extends. This nipple portion 52 of the end frame member fits snugly into a circular aperture 54 in the end wall 24 of the casing or shell 22. The smooth shank portion 42 of the actuating screw member 14 extends to the exterior of the shell through the nipple portion 52.

Each of the longitudinal frame members 20 and 21 may be of identical construction. In the construction shown, each comprises a flat metal bar with an aperture 55 at one end to serve as a socket to seat a projection 36 of the end member 16 and with an aperture 56 at the outer end to serve in like manner as a socket for a projection 48 of the end member 18.

It is contemplated that the rectangular frame formed by the two end members 16 and 18 and the two longitudinal frame members 20 and 21 will be tapered slightly, i.e. progressively reduced in both of its transverse dimensions in accord with the taper of the shell 22 to fit into the shell in a snug wedging manner. The taper with respect to one of the transverse dimensions is accomplished by making the end frame member 16 slightly wider than the end frame member 18. With respect to the second transverse dimension, I prefer to achieve the taper configuration simply by forming a plurality of outwardly projecting dimples in the two longitudinal frame members 20 and 21 with the dimples graduated in their projection dimensions. In the construction shown, each of the metal bars that serves as the longitudinal frame members 20 and 21 has a dimple 58 near the end aperture 55 and a second dimple 60 at a mid point of the frame member, the dimple 58 projecting outwardly to a greater extent than the dimple 60.

It is essential, of course, that the two longitudinal frame members 20 and 21 be assembled with their dimples 58 adjacent the end frame member 16 rather than the end frame member 18. In this regard, a feature of the invention is that the projections 36 of the end frame member 16 and the corresponding apertures 55 of the two longitudinal frame members 20 and 21 are of a different configuration than the projections 58 of the end frame member 18 and the corresponding apertures 56 so that each of the longitudinal frame members can be assembled to the end frame members only at the correct longitudinal orientations. In this instance, the lugs 36 and the corresponding apertures 55 are wider than the lugs 48 and the corresponding apertures 56.

As best shown in FIGS. 2 and 3, the contact or wiper member 15 is carried by a traveling nut 62 that is threadingly mounted on the actuating screw member 14. In this instance, the traveling nut 62 is a molded block of nylon in sliding contact with the longitudinal frame member 20. An adjustable set screw 64 may be mounted in the end frame member 16 as shown in FIG. 3 to serve as a stop means for abutment by the traveling nut 62. As best shown in FIG. 2, the wiper 15 is in the form of a leaf spring having an inner U-shaped portion 65 straddling and pressing against the ground rod 12 and an outer U-shaped portion 66 pressing against the impedance member 10. The wiper 15 may be mounted on the nylon block by a pair of screws 68.

In the final assembly of the device, a nut member 70 which may be made of suitable metal is threaded onto the nipple portion 52 of the plastic end frame member 18. The nut member 70 backs against the outer surface of the end wall 24 of the casing to pull axially outward on the nipple portion 52 of the plastic end frame member 18 and thus effect a fluid-tight seal at the inner rim of the circular aperture 54 of the casing. The fluid-tight seal is accomplished by forming the inner rim of the aperture 54 to a clean sharp 90° edge 71, as shown in FIG. 9, and by forming the base or inner end of the nipple portion 52 with a fillet 72, shown in the same figure. When the nut is tightened, the sharp circular edge 71 digs into the fillet 72 deforming the fillet material to make the final sealed joint shown in FIG. 7.

When the nut member 70 pulls outward on the nipple portion 52 to make the inner seal as just described, the nut member at the same time causes the plastic material of the nipple portion to contract radially around the smooth shank portion 42 of the actuating screw 14 in a fluid-tight manner. An important advantage of employing a plastic material such as nylon for the nipple portion 52 is that the nylon is sufficiently yieldable for radial contraction to grip the smooth shank portion 42 of the actuating screw member in a fluid-tight manner. The tightly gripped shank portion turns freely not only because of its small diameter but also because of the low coefficient of friction afforded by the nylon.

The nut member 70 causes the nylon nipple portion 52 to contract in a manner that may be understood by reference to FIG. 8. In FIG. 8, it can be seen that the turns 73 of the screw thread of the nut member 70 press axially against the turns 74 of the screw thread of the nipple portion 52 in a manner that tends to cam the screw threads 74 radially inwardly towards the shank portion 42 of the actuating screw member.

In the construction shown, the nut member 70 in turn is formed with a nipple extension 75 that has a tapered nose 76 and is formed with a plurality of longitudinal slots 78. A lock nut 80 threads onto the nipple extension 75 and is formed with an inner tapered surface 82 to cooperate with the tapered nose 76 to cause the nipple extension to grip and immobilize the shank portion 42 of the actuating screw member at selected adjustments of the actuating screw member. The outer end of the shank portion 42 of the actuating screw member carries a suitable operating knob 84, the operating knob being secured by a suitable set screw 85 that tightens against a flat surface 86 of the shank portion.

The manner in which the invention serves its purpose may be readily understood from the foregoing description. It is apparent that all of the parts are adapted for mass production at economical cost. The first steps in the assembly procedure may be to thread the traveling nut 62 onto the actuating screw 14 and to pass the ground rod 12 through the wiper 15. The next step may be to assemble the actuating screw 14, the ground rod 12 and the impedance member 10 to the two end frame members 16 and 18. Then the two longitudinal frame members 20 and 21 may be snapped into position in engagement with the projections 36 of the end frame member 16 and the projections 58 of the end member 18. With the rectangular frame completed in this manner, the four wires may be passed through the bore 35 in the end frame member 16 and soldered to the metal terminal elements 28 in the closure plate 25, the wires being soldered in such manner as to make the terminal elements fluid-tight.

The rectangular frame comprising the longitudinal frame members 20 and 21 assembled to the end frame members 16 and 18 is then inserted endwise into the plastic shell 22, the nipple portion 52 of the end frame member 18 extending through the circular aperture 54 in the end of the shell when the frame is fully inserted. The tapered frame fits in the tapered shell in a snug wedging manner with the longitudinal frame members 20 and 21 slightly bowed inward to cause the dimples 58 and 60 to press outward against the shell in a manner to resist vibration. The closure plate 25 is then bonded to the open end of the shell 22 in a fluid-tight manner by means of a suitable cement.

The next step is to screw the nut member 70 onto the nipple portion 42 of the end frame member 18 and to tighten the nut member against the end wall 24 of the shell 22. As heretofore explained, this tightening action makes this end of the shell fluid-tight and yet permits free rotation of the actuating screw 14. The lock nut 80 is then loosely threaded onto the nipple extension 75 of the nut member 70 and finally the operating knob 84 is mounted on the end of the shank portion 42 of the actuating screw 14. When the device is placed in service, the lock nut 80 may be tightened to hold the operating screw 14 at a selected position of adjustment.

My description in specific detail of the selected embodiment of the invention will suggest various changes, substitutions and other departures from my disclosure within the spirit and scope of the appended claims.

I claim:

1. In an electrical component of the character described wherein a traveling nut mounted on an actuating screw member for control thereby carries a wiper for traversing a conductor member extending parallel with the screw member, an assembly for mounting and housing said members, including: first and second end frame members supporting the opposite ends of said conductor member and journaling the opposite ends of said screw member with one end of the screw member extending through and beyond one of the first and second end frame members; first and second longitudinal frame members cooperating with said end frame members to form a substantially rectangular frame, the end and longitudinal frame members being provided with projections and sockets whereby the rectangular frame may be assembled by forcing said longitudinal frame members laterally against said end members to seat said projections in said sockets; and an elongated casing conforming to the configuration of said frame, said casing embracing the frame and holding said longitudinal and end frame members in interlocking engagement, one end of said casing having an aperture for extension therethrough of one end of the screw member.

2. An assembly as set forth in claim 1 in which the interior of said casing is longitudinally tapered and said rectangular frame is correspondingly longitudinally tapered to slide into the casing through one end of the casing into tight wedging fit in the casing.

3. An assembly as set forth in claim 1 in which said casing and said end frame members are made of nonconducting plastic material; and in which said longitudinal frame members are metal bars with dimples formed therein for pressure contact with the inner surface of the casing.

4. An assembly as set forth in claim 2 in which said longitudinal frame members have relatively small longitudinally spaced projections of progressively decreasing height to give the frame its longitudinally tapered configuration.

5. In an electrical component of the character described wherein a traveling nut mounted on an actuating screw member for control thereby carries a wiper for traversing a conductor member extending parallel with the screw member, an assembly for mounting and housing said members, including: first and second end frame members supporting the opposite ends of said conductor member and journaling the opposite ends of said screw member with one end of the screw member extending through and beyond the first frame member, each of said end frame members being formed with projections at its two opposite ends; first and second longitudinal frame members cooperating with said end frame members to form a substantially rectangular frame, said longitudinal frame members having sockets at their opposite ends to receive said projections whereby the rectangular frame may be assembled by forcing said longitudinal frame members laterally against said end frame members to seat said projections in said sockets; and an elongated casing conforming to the configuration of said frame and encircling the frame to hold said longitudinal frame members in interlocking engagement with said end frame members and provided with a configuration to obtain a longitudinal sliding movement of the frame into proper position within the casing.

6. An assembly as set forth in claim 5 in which said longitudinal frame members are flat bars with apertures in their opposite ends to serve as said sockets; and in which the apertures and corresponding projections on the end frame member at one end of the frame differ in configuration from the apertures and corresponding projections on the end frame member at the other end of the frame whereby each of said flat bars may be assembled to the end frame members in only one predetermined longitudinal orientation.

7. In an electrical component of the character described wherein a traveling nut mounted on a long screw member for control thereby carries a wiper for traversing a conductor member extending parallel with the screw member, the screw member having a smooth shank at one end, an assembly for mounting and housing said members, comprising: an elongated casing closed at first and second opposite ends to define end walls and provided with an aperture in the first end wall of the casing; an elongated open frame fitting snugly in said casing, said frame supporting the opposite ends of said conductor member and journaling the opposite ends of said screw member with said shank portion of the screw member extending through said aperture, one end of said frame being made of a slightly yieldable material and having an externally threaded nipple portion embracing said shank portion of the screw member and extending through said aperture, said nipple portion being formed with a fillet at its inner end and said casing being made of relatively hard unyielding material with said aperture of the casing formed with an inner rim for contact with said fillet; and a nut member threaded onto said nipple portion for tightening against the outer side of said particular end wall of said casing to cause said inner rim to dig into said fillet in a fluid-tight manner.

8. In an electrical component of the character described wherein a traveling nut mounted on a long screw member for control thereby carries a wiper for traversing a conductor member extending parallel with the screw member, the screw member having a smooth shank at one end, an assembly for mounting and housing said members, comprising: an elongated casing closed at first and second opposite ends to define end walls and provided with an aperture in the first end wall of the casing; an elongated open frame fitting snugly in said casing, said frame supporting the opposite ends of said conductor member and journaling the opposite ends of said screw member with said shank portion of the screw member extending through said aperture, one end of said frame being made of a slightly yieldable material and having an externally threaded nipple portion embracing said shank portion of the screw member and extending through said aperture; and a nut member threaded onto said nipple portion in contact with the outer surface of said first end wall and holding the end of the frame against the first end wall of the casing, the screw thread of said nut member acting with cam action on the screw thread of the nipple portion for inward contraction of the slightly yielding material of the nipple portion into sealing contact with said smooth shank portion of the screw member.

9. An assembly as set forth in claim 8 in which said nut member has a nipple extension beyond said nipple portion of the frame, said nipple extension embracing said shank portion of the screw member and being slotted longitudinally for radial contraction, said nipple extension having a smooth tapered nose; and in which the nut member includes a locking nut threaded onto said nipple extension, said locking nut having a smooth tapered inner circumferential surface for cooperation with said tapered nose to contract the slitted nipple extension to grip and immobilize said screw member.

10. An assembly as set forth in claim 8 in which said casing comprises a rigid plastic shell open at one end and closed at the other end together with a closure member sealing said one end, said aperture being at the closed end of the shell, and in which terminal members are mounted in said closure for connecting the electrical parts of the component to external circuitry.

11. An assembly as set forth in claim 8 in which said casing is made of rigid, non-conducting plastic material and said plastic material of the frame is nylon.

12. In combination: a screw member, a nut mounted on the screw member for movement along the screw member, a conductive wiper carried by the nut for movement with the nut, a first conductive member disposed relative to the wiper to produce electrical continuity with the wiper in the different positions of the wiper, first and second end frame members spaced to support the conductor member and the screw member with one end of the screw member extending beyond the first frame member, the first end frame member being made of a material having yieldable properties, and first and second longitudinal frame members cooperating with the first and second end frame members to form a substantially rectangular frame, one of the end and longitudinal frame members at each corner of the frame having a socket and the other one of the frame members at the corners having a projection to seat in the sockets, an elongated casing constructed to receive the frame in close fit and closed at one end with an aperture in the closed end, the first end frame having an externally threaded nipple portion embracing the screw member and extending through the aperture in the closed end of the casing, and a nut member threaded on the nipple portion of the first end frame in engagement with the closed end of the casing and holding the end of the frame against the closed end and cooperating with the nipple portion of the first end frame to obtain an inward contraction of the nipple portion into sealing relationship with the screw member.

13. The combination set forth in claim 12, including, a second conductive member, the first and second conductive members being disposed in spaced and parallel relationship to the screw member and being disposed with the second conductive member on one side of the first conductive member and with the wiper on the other side of the first conductive member, the nut being provided with first and second conductive portions each having a U-shaped configuration and being made from a resilient material, the first U-shaped conductive portion of the nut being disposed to engage the first conductive member on the side of the first conductive member near the second conductive member and the second U-shaped conductive portion of the nut being disposed to engage the second conductive portion.

14. In combination: a first conductive member, an actuatable screw member, first and second end frame members supporting the opposite ends of the conductive member and journaling the opposite ends of the screw member with one end of the screw member extending through the first end frame member to a position beyond the first end frame member, each of the end frame members being formed with projections at its two opposite ends, first and second longitudinal frame members cooperating with the end frame members to form a substantially rectangular frame, the longitudinal frame members having sockets at their opposite ends to receive the projections on the end frame members for the assembly of a rectangular frame by forcing the longitudinal frame members laterally against the end frame members to seat the projections on the longitudinal frame members in the sockets in the end frame members, an elongated casing conforming to the configuration of the rectangular frame and enveloping the rectangular frame to hold the longitudinal frame members in interlocking engagement with the end frame members, the elongated casing being provided with a configuration to obtain a longitudinal sliding movement of the rectangular frame into the casing in enveloping relationship within the casing, the casing being provided with an end wall having an opening in the end wall, a traveling nut mounted on the screw member for movement along the screw in accordance with the actuation of the screw member, a wiper carried by the nut and engaging the first conductive member at positions along the first conductive member dependent upon the disposition of the nut on the screw member, one of the end frame members being provided with an externally threaded nipple portion embracing the screw member and extending through the opening in the end wall of the casing, and a nut member threaded onto the nipple portion of the first end frame in contact with the end wall of the casing and holding the first end frame against the end wall of the casing, the nut member being threaded on the nipple portion to provide a cam action on the nipple portion for inward contraction of the nipple portion into sealing contact with the screw member.

15. The combination set forth in claim 14 in which a second conductive member is disposed in spaced and parallel relationship to the screw member and in spaced and parallel relationship to the first conductive member and in which the wiper is provided with a first U-shaped conductive portion extending on the far side of the first conductive member relative to the screw member and is provided with resilient characteristics to press against the first conductive member, and in which the wiper is also provided with a second U-shaped conductive portion extending to the second conductive member and provided with resilient characteristics to press against the second conductive member, and in which the second conductive portion of the wiper is disposed within the first conductive portion of the wiper.

References Cited in the file of this patent

UNITED STATES PATENTS

| | | |
|---|---|---|
| 2,779,496 | Henderson | Jan. 29, 1957 |
| 2,870,302 | Bourns et al. | Jan. 20, 1959 |
| 2,902,663 | Abatemarco et al. | Sept. 1, 1959 |

FOREIGN PATENTS

| | | |
|---|---|---|
| 870,149 | France | Dec. 5, 1941 |